ELECTRIC WAVE CONVERTER

Filed March 22, 1965

INVENTOR.
James A. Bright
BY McGrew & Edwards
ATTORNEYS

United States Patent Office 3,343,064

Patented Sept. 19, 1967

3,343,064

ELECTRIC WAVE CONVERTER

James A. Bright, 4781 E. Colorado Ave., Denver, Colo. 80222

Filed Mar. 22, 1965, Ser. No. 441,685

5 Claims. (Cl. 321—8)

This invention relates to apparatus for converting alternating current electric signals to direct current signals and particularly to an improved highly stable A.C. to D.C. converter for effecting highly accurate linear signal translation.

In various applications of electric signal translating apparatus it is desirable that an alternating signal be converted to a direct current signal for purposes of comparison or measurement. In precision measuring equipment requiring extreme accuracy it is necessary that the signal converting circuits effect the translation of electric signals without distortion over the entire range of operation of the equipment. While presently available signal converting circuitry has been satisfactory for precision measurements in various applications, it has not been entirely satisfactory for all high precision applications. Accordingly, it is an object of the present invention to provide an improved A.C. to D.C. converter of extremely high accuracy.

It is another object of this invention to provide a highly accurate A.C. to D.C. converter including an improved arrangement for assuring a high degree of stability and linearity throughout its operating range.

Briefly, in carrying out the objects of this invention in one embodiment thereof, an A.C. to D.C. converter is provided which comprises a differential D.C. amplifier having oppositely connected half wave rectifiers in parallel branches in its output circuit whereby direct current outputs are obtained corresponding to the positive and negative half cycles of the impressed alternating current signal. High stability and linearity are achieved by employing a degenerative feedback circuit arranged so that it operates to provide a feedback signal comprising both the direct current component of the amplifier output and the alternating current signal. The feedback circuit is connected through A.C. coupling networks which isolate the direct current output of the converter from the direct current component or level of the amplifier.

The arrangement of the circuit as set forth above is such that two such circuits may be employed, each to convert a respective one of two alternating current signals and then, by combining of the outputs of the two converter circuits, a signal will be produced which is either the sum or the difference of the two signals; this produces a sum or difference signal independent of any phase difference of the original alternating current signals. In another application of a single converter circuit the original A.C. signal, after conversion to a corresponding direct signal having a high degree of linearity, may be employed to operate a precision direct current meter or other devices which require a D.C. input.

The features of novelty which characterize this invention are pointed out with particularity in the claims annexed to and forming a part of this specification. The invention itself, however, both as to its organization and manner of operation, together with further objects and adavntages thereof, will be best understood upon reference to the following description taken in connection with the accompanying drawings, in which:

Figure 1:
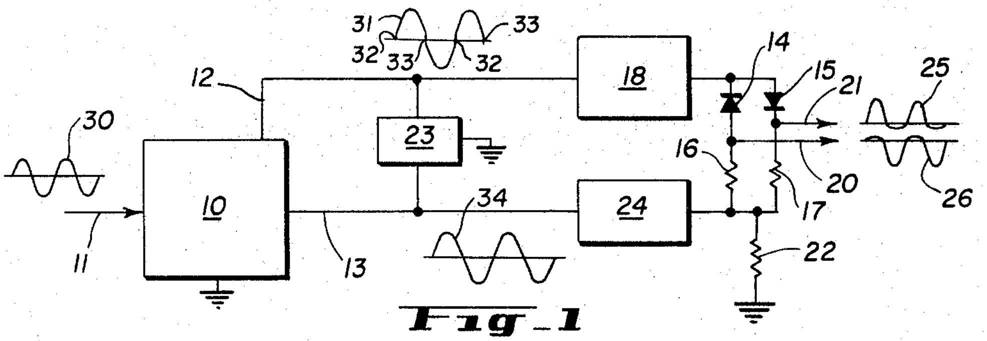
FIG. 1 is a diagrammatic illustration of a circuit embodying the invention.

Referring now to the drawing, the system illustrated in FIG. 1 comprises a direct current amplifier 10 having an input 11, an output 12 and a feedback input 13. The output of the amplifier is supplied to a rectifying network comprising diodes 14 and 15 which are connected oppositely in parallel branch circuits, each circuit including a diode and a resistance in series therewith as indicated at 16 and 17, respectively. The rectifier circuit thus comprises two half wave rectifier paths and this input circuit is coupled to the amplifier by an alternating current network 18 which isolates the input of the rectifier circuit from the amplifier output with respect to direct current signals. The output of the converter may be taken from either of the branch circuits, two outputs 20 and 21 having been indicated as connected to the juncture of the diode and resistances in the branch circuits, the output 20 being taken from the resistor 16 and the output 21 from the resistor 17. The branch circuits are connected through a resistance 22 to ground to provide the return circuit of the system.

In order to secure the required linearity and the precision operation of the converter a degenerative feedback circuit is provided which includes a low-pass filter 23 connected between the output of the amplifier and the feedback input 13 to supply a direct current level signal to the feedback and an alternating current coupling network 24 connected between the feedback input and the junction between the branched circuits and the resistance 22. This latter connection supplies to the feedback input an alternating current signal which results from the combined D.C. signals from the half wave rectifiers 14 and 15. The resistance 22 is substantially lower than the resistances 16 and 17 so that the amplitude of the alternating current is relatively small as compared with the amplitude of the unidirectional signals at the outputs 20 and 21. The wave form of these outputs as indicated opposite the respective leads comprises a series of positive pulses 25 at the output 21 and a series of negative pulses 26 at the output 20. These half wave D.C. pulses are modified slightly by the low amplitude A.C. wave resulting from the drop across the resistor 22. It will be understood that this A.C. wave may readily be removed completely from the D.C. output by a utilization device having filters designed for this purpose so that the ultimate D.C. level provided in each case will reflect solely the D.C. components of the respective pulses.

During the operation of the circuit of FIG. 1, if a sine wave such as indicated at 30 is impressed on the input 11 of the amplifier 10, a wave 31 will be produced at the output connection 12. This wave 31 includes nearly vertical portions 32 and 33 comprising the initial portions of a sinuosoidal wave of much greater amplitude than that of the wave 31 and which represents the amplifier output without feedback. These short "jump" portions 32 and 33 are the result of the threshold characteristics of the diodes 14 and 15, it being necessary to attain the threshold voltage before one or the other of the diodes conducts and produces the required feedback voltage across the resistance 22. The threshold is, of course, reached in a very brief interval of time and the wave 31 results.

As pointed out above, the output waves 25 and 26 include a small amplitude A.C. component which represents the feedback voltage appearing across the common resistance 22. This voltage is applied through the A.C. coupling 24 to the feedback input 13 and is represented by a sinusoidal wave 34 appearing at the output of the coupling 24, the amplitude of the positive and negative half cycles being equal. At the same time any D.C. output appearing at the amplifier output 12 is connected through the low-pass filter 23 to the feedback input 13. This D.C. feedback connection holds the operating points of the amplifier constant under widely varying environmental conditions and this constancy of the operating point results in improved A.C. gain stability, the A.C. characteristics of the amplifier components changing with changes in the operating point. The filter 23 is designed so that it does not pass any significant amount of alternating current signal within the range of frequencies of operation of the converter.

It is significant that the converter circuit provided by this invention employs only two A.C. coupling networks regardless of the loop gain employed in the feedback circuit, and a higher range of loop gain is thus made practical as compared with systems which require more complicated coupling networks. The higher loop gain ultimately to be secured by the arrangement of this invention results in greater gain stability. Furthermore, fewer bulky components are required in the electronic circuit in order to achieve a required gain stability. With this arrangement of two A.C. coupling networks, low frequency stability problems are less severe.

The two A.C. coupling networks completely isolate the direct current output signals from the direct current portions of the amplifier so that the direct current output signals result solely from the alternating current output signal and do not contain D.C. or "drift" components resulting from direct current conditions in the amplifier. This arrangement of the coupling circuit thus results in greater direct current stability.

During the operation of the system the low-pass filter 23 provides a high degree of direct current feedback which is effective to hold the operating points constant as indicated above and to do so under widely varying environmental conditions. Thus ambient temperature changes have a negligible effect on the operation of the converter.

The feedback circuit may be employed with either a single-ended or a differential amplifier and the feedback may be employed not only for securing precision A.C. to D.C. conversion but also simultaneously to raise or lower the input impedance.

When the amplifier 10 is a D.C. differential amplifier, its output is proportional to the difference between the signals impressed on the input 11 and feedback 13. In this case when the difference between the signal at the input 11 and that at the feedback 13 is positive, the signal at the output 12 goes positive, and when the difference is negative the output goes negative. The output at 12 is proportional to the difference between the signals at 11 and 13. The A.C. signal at the output 12, if positive, is applied through the network 18, diode 15, resistance 17 and the A.C. coupling network 24, thereby making the feedback input at 13 positive. This signal at the feedback input 13 will assume a value nearly equal to the input at 11 so that the difference between the two signals is equal to the signal output at 12 divided by the amplifier gain. The difference between the signals at 11 and 13 can be made as small as desired by suitable raising of the amplifier gain.

The feedback tends to make the signal at 13 equal to that at 11 for all practical purposes and the output at 12 will attain a value necessary to produce this equality of signals. Assuming that the coupling networks 18 and 24 introduce no losses at the frequency of operation of the system, then the signal at 12 will be larger than the difference between the signals at 11 and 13 by an amount equal to the attenuation through the diode 15, resistance 17 and resistance 22. The signal at the output 12 is alternating, successive cycles being positive and negative, and thus is conducted alternately through the diodes 14 and 15, a net negative signal appearing between the diode 14 and resistance 16. Either or both of these D.C. outputs may be supplied to a utilization device. The level of the D.C. outputs is determined primarily by the values of the resistance 22 and the respective resistances 16 and 17 so that the gain stability can be determined by the stability of these resistances.

Because of the D.C. blocking effect of the A.C. networks 18 and 24, the feedback through the low-pass filter 23 can be nearly 100% effective so that the entire D.C. signal or level is applied at the feedback input 13 of the amplifier. The function of the low-pass filter is to hold the D.C. level and maintain all operating points of the amplifier constant.

Figure 2:
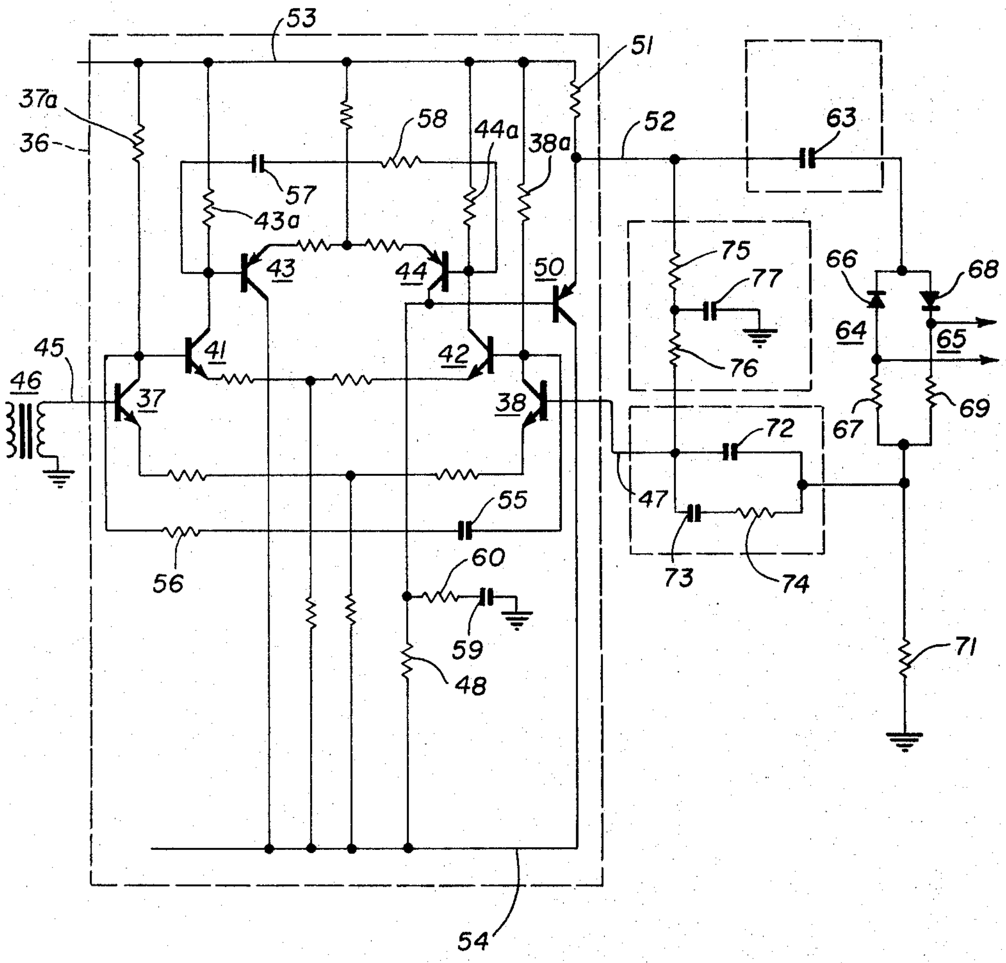
FIG. 2 is a schematic circuit diagram of a circuit of the type illustrated in FIG. 1 wherein the amplifier is a D.C. differential amplifier.

Referring now to FIG. 2, the converter illustrated in this figure is essentially similar to that illustrated in FIG. 1 but employs a specific form of direct current differential amplifier.

Referring now to FIG. 2, the D.C. differential amplifier, indicated within the dotted rectangle 36, comprises a three-stage amplifier employing transistors, the first stage comprising NPN transistors 37 and 38, the second stage NPN transistors 41 and 42, and the third stage PNP transistors 43 and 44. The alternating current input signal is applied to the base of transistor 37 through a connection 45, the signal being supplied from a source (not shown) coupled to the input through a transformer 46; the feedback signal is supplied through a connection 47 to the base of the transistor 38. The difference signal appears between the collectors of the transistors 37 and 38 across resistances 37*a* and 38*a* and is applied to the bases of the second-stage transistors 41 and 42. The second stage amplifies the difference signal and which is generated across resistances 43*a* and 44*a* and applied to the respective bases of the transistors 43 and 44 which are connected to the collectors of the transistors 41 and 42.

The amplified output signal appears at the collector of the transistor 44 across a resistance 48 and is supplied to the base of a PNP transistor 50; this transistor is provided to reduce the output impedance of the amplifier and its output appears across a resistance 51 in its emitter circuit and is taken off at a connection 52. The required operating currents for the transistors are supplied from a positive supply lead 53 connected to the collectors of the NPN transistors of the first two stages and a negative supply lead 54 connected to the collectors of the PNP transistor of the third stage and output.

High frequency oscillations of the amplifier circuits are prevented by employing three R–C networks. These networks comprise a capacitor 55 and a resistance 56 connected in series between the collectors of the transistors 37 and 38, a capacitance 57 and a resistance 58 connected in series between the collectors of the transistors 41 and 42 and a capacitor 59 and resistance 60 connected in shunt to the load resistor 48.

The output 52 is coupled through a capacitor 63 to branch circuits 64 and 65 comprising, respectively, a diode 66 and resistance 67 in series and a diode 68 and resistance 69 in series. The resistances 67 and 69 are equal. The diodes 66 and 68 have the same characteristics but are oppositely connected in the output circuit so that the diode 68 is conducting on the positive half cycle and the diode 66 on the negative half cycle. The capacitor 63 comprises an A.C. coupling network corresponding to the network 18 of FIG. 1.

The branch circuits 64 and 65 are connected in series with a resistance 71 which is of substantially lower value than the equal resistances 67 and 69 and a resultant alternating current signal appears across this resistor 71 and is coupled to the feedback input 47 through an A.C. coupling network comprising a capacitor 74 shunted by a capacitor 73 and resistance 74 in series. The D.C. component of the output signal appearing on the lead 52 is connected to the feedback input 47 through resistances 75 and 76 in series; the connection between these resistances is connected to ground through a capacitance 77 which bypasses the alternating current energy from the resistance 74. The resistances 75 and 76 and the capacitance 77 comprise a low-pass filter corresponding to the low-pass filter 23 of FIG. 1.

The operation and apparatus of FIG. 2 is essentially the same as that described in connection with FIG. 1, the effect and characteristics of the degenerative feedback circuit being the same.

For purposes of illustration, and not by way of limitation, one A.C. to D.C. converter embodying the invention which was constructed in the manner illustrated in FIG. 2 was principally for use in the frequency range of 1000 to 5000 cycles per second. The NPN transistors of the first two stages of the differential amplifier were all Type 2N336 and the PNP transistors of the third stage and output were all Type 2N652. The diodes in the output converter were both Type 1N3605.

The resistance and capacitance components of the system had the following values:

| | | |
|---|---|---|
| Resistances: | | |
| **37***a* and **38***a*, each | ohms | 20,000 |
| **43***a* and **44***a*, each | do | 4,750 |
| **48** | do | 15,000 |
| **51** and **56**, each | do | 2,700 |
| **58** | do | 680 |
| **60** | do | 1,000 |
| **67** and **69**, each | do | 10,000 |
| **71** | do | 1,500 |
| **74** | do | 147,000 |
| **75** and **76**, each | do | 32,400 |
| Emitter resistances of transistors **37** and **38**: | | |
| individual, each | do | 178 |
| common | do | 15,000 |
| Emitter resistors of transistors **41** and **42**: | | |
| Individual, each | do | 332 |
| Common | do | 10,000 |
| Emitter resistors of transistors **43** and **44**: | | |
| Individual, each | do | 274 |
| Common | do | 2,200 |
| Coupling capacitors **63** and **73**, each | mfd | 1.0 |
| Coupling capacitor **72** | mfd | .047 |
| Bypass capacitor **77** | mfd | 15.0 |
| Capacitor **55** | mfd | .0015 |
| Capacitor **57** | mmfd | 750.0 |
| Capacitor **59** | mmfd | 220.0 |

The circuit constructed with the components as set forth above was operated as one branch of a precision measuring apparatus employing two similar circuits for obtaining a direct current voltage representing the difference between two alternating current signals representing a quantity to be measured. The apparatus was found to be effective for resolving differences of the order of one part in 20,000 and better.

While the invention has been described in connection with a specific circuit and circuit components, various modifications and other applications will occur to those skilled in the art. Therefore it is not desired that the invention be limited to the details illustrated and described and it is intended by the accompanying claims to cover all modifications which fall within the spirit and scope of the invention.

I claim:

1. An A.C. to D.C. converter comprising a D.C. amplifier having an input and an output and a feedback input, output circuit means for said amplifier including rectifier means for producing D.C. signals corresponding, respectively, to the positive and negative portions of the A.C. output signal, means including an A.C. feedback path and a D.C. feedback path for applying simultaneously to said feedback input a degenerative D.C. signal component from said amplifier output and a degenerative A.C. signal produced by recombining said D.C. signals, and means for preventing the passage of alternating current through said D.C. feedback path and for preventing the passage of direct current through said A.C. feedback path.

2. An A.C. to D.C. converter comprising a direct current amplifier having an input and output and a feedback input, an output circuit including two parallel branches each branch comprising a half-wave rectifier and a resistance in series, said rectifiers being oppositely connected with respect to the output whereby the positive and negative half cycles of the amplifier output signal pass through respective ones of said branches, a third resistance in series with said parallel branches on the output side thereof, and a degenerative feedback path for applying both A.C. and D.C. components of the amplifier output signal to said feedback input, said feedback path including an A.C. coupling between said third resistance and said feedback input and a D.C. connection comprising a low-pass filter between said amplifier output and said feedback input whereby the D.C. component of said amplifier output is impressed on said feedback input simultaneously with the A.C. signal appearing across said third resistance, and a second A.C. coupling between said amplifier output and said branches and cooperating with said first mentioned coupling for isolating said D.C. connection from said branches.

3. An A.C. to D.C. converter comprising a differential direct current amplifier having first and second inputs and an output, means including a pair of oppositely connected half-wave rectifiers in said output circuit for providing respective separate parallel paths for the positive and negative half cycles of the A.C. output signal of said amplifier, means providing a D.C. signal feedback path between said output and said second input, means for removing A.C. signal components from said D.C. path, an output connection for supplying D.C. signals from one of said parallel paths, a common resistance connected in series with said parallel paths on the side thereof remote from said output, a feedback path connected between said resistance and said second input for providing a feedback of an alternating current output signal, and capacitive coupling means between said output and said parallel paths and between said input and said resistance for isolating said parallel paths from said amplifier with respect to said direct current signals.

4. An A.C. to D.C. converter comprising a differential direct current amplifier having first and second inputs and an output for producing an output signal proportional to the difference between the input signals, an output circuit including two parallel branch circuits each comprising a half-wave rectifier and a respective resistance connected in series, a capacitive coupling between said branches and said output, an output terminal for said converter connected to one of said branch circuits between one of said half-wave rectifiers and its respective resistance, a common resistance in said output circuit in series with said branches for combining the signals from said branches, means including an A.C. coupling for connecting said resistance and said second input, and means including a low-pass filter for connecting said differential amplifier output and said second input whereby the signal supplied to said input constitutes a degenerative feedback signal for said amplifier.

5. An A.C. to D.C. converter comprising a direct current differential amplifier having first and second inputs and an output for producing an output signal proportional to the difference between the input signals, said amplifier comprising a plurality of amplifying stages each stage comprising a pair of transistors and the bases of the transistors in the first of said stages being connected to said first and second inputs, respectively, means including a transistor connected to one of the transistors in the last of said stages for coupling the last of said stages to said outlet and for reducing the output impedance of said amplifier, an output circuit including two parallel branch circuits each comprising a half-wave rectifier and a resistance connected in series, a capacitive coupling between said branches and said output, an output terminal for said converter connected between one of said half wave rectifiers and its respective resistance, a common resistance in said output circuit in series with said branches for combining the signals in said branches, means including an A.C. coupling for connecting said resistance and said second input, and means including a low-pass filter for connecting said differential amplifier output and said second input whereby the signal supplied to said input constitutes a degenerative feedback signal comprising both A.C. and D.C. components of the output of said amplifier.

References Cited

UNITED STATES PATENTS

| | | | |
|---|---|---|---|
| 2,741,668 | 4/1956 | Iffland | 330—9 |
| 3,310,726 | 3/1967 | James | 321—8 |

JOHN F. COUCH, *Primary Examiner.*

W. H. BEHA, *Assistant Examiner.*